United States Patent [19]

Hayton

[11] Patent Number: 5,129,783
[45] Date of Patent: Jul. 14, 1992

[54] GAS TURBINE ENGINES

[75] Inventor: Paul R. Hayton, Watford, England

[73] Assignee: Rolls-Royce plc, England

[21] Appl. No.: 579,964

[22] Filed: Sep. 10, 1990

[30] Foreign Application Priority Data

Sep. 22, 1989 [GB] United Kingdom ............. 8921450

[51] Int. Cl.$^5$ .............................................. F01D 1/02
[52] U.S. Cl. ............................... 415/209.3; 415/209.2
[58] Field of Search ............... 415/209.3, 189, 190, 415/191, 209.2

[56] References Cited

U.S. PATENT DOCUMENTS

| 2,819,871 | 1/1958 | McVeigh | 415/209.3 |
|---|---|---|---|
| 3,326,523 | 6/1967 | Bobo | 415/209.3 |
| 3,881,844 | 5/1975 | Hennessey et al. | |
| 3,966,353 | 6/1976 | Booher | 415/190 |
| 3,997,280 | 12/1976 | Germain | 415/209.3 |
| 4,477,086 | 10/1984 | Feder et al. | |
| 4,500,098 | 2/1985 | Wilcox et al. | |
| 4,543,039 | 9/1985 | Ruis | 415/189 |
| 4,820,120 | 4/1989 | Feuvrier et al. | |
| 4,834,613 | 5/1989 | Hansen | 415/189 |
| 4,875,828 | 10/1989 | Willkop | 415/209.3 |
| 4,990,056 | 2/1991 | McClain | 415/189 |

FOREIGN PATENT DOCUMENTS

| 0017306 | 10/1980 | European Pat. Off. |
|---|---|---|
| 0112674 | 4/1984 | European Pat. Off. |
| 0148088 | 7/1985 | European Pat. Off. |
| 858891 | 1/1961 | United Kingdom . |
| 1386949 | 3/1975 | United Kingdom . |
| 2039331 | 8/1980 | United Kingdom . |
| 2041112 | 9/1980 | United Kingdom . |
| 2043798 | 10/1980 | United Kingdom . |
| 2084261 | 4/1982 | United Kingdom ............. 415/189 |
| 2129503 | 5/1984 | United Kingdom . |
| 2172347 | 9/1986 | United Kingdom . |

Primary Examiner—Edward K. Look
Assistant Examiner—Therese M. Newholm
Attorney, Agent, or Firm—Oliff & Berridge

[57] ABSTRACT

In a gas turbine engine having a ceramic nozzle guide vane and a metal engine casing, a nozzle guide vane mounting comprises on the radially outermost end of the vane a circumferential flange extending at right angles to the long axis of the vane, a first spring means for applying a radially inward force to the radially outer surface of the flange, a second spring means for applying a radially outward force to the radially inner surface of the flange, and structural members of the engine casing to nip the first and second spring means between the structural members and the flange. The spring means may be C-ring seals made of a resilient material.

8 Claims, 2 Drawing Sheets

GAS TURBINE ENGINES

BACKGROUND OF THE INVENTION

This invention concerns improvements in or relating to gas turbine engines, and in particular concerns an improved mounting of ceramic nozzle guide vanes on the engine casing.

In the operation of a gas turbine engine, air at atmospheric pressure is initially compressed and delivered to a combustion stage where heat is added to the air leaving the compressor by adding fuel to the air and burning it. The gas flow resulting from combustion of fuel in the combustion stage then expands through a turbine, delivering up some of its energy to drive the turbine and produce mechanical power, the remainder, on discharge to the atmosphere, providing a propulsive jet, in the case of the gas turbine jet engine, for example. In order to produce a driving torque, the turbine consists of one or more stages, each employing one row of stationary nozzle guide vanes and one row of moving blades mounted on or integral with a disc. The nozzle guide vanes are aerodynamically shaped to direct incoming gas from the combustion stage onto the turbine blades and thereby transfer kinetic energy to the blades.

Gases entering the turbine stage typically have an entry temperature from about 850° C. to at least 1700° C. Since the efficiency and power output of the turbine depend on the entry temperature of the incoming gas there is a trend in gas turbine engine technology to increase the gas temperature. A consequence of this is that the materials of which the blades and vanes are made assume ever-increasing importance with a view to resisting the effects of elevated temperature.

Nozzle guide vanes were originally made of high temperature steels or nickel alloys. More recently, it has been found that resistance to even higher gas entry temperatures may be imparted to the vanes by making them entirely of ceramic. If the nozzle guide vanes are ceramic it is important that, when they are mounted on the engine casing, which is made of metal, due regard is given to the different coefficients of expansion of the ceramic material and of the metal in the casing. It is an object of the present invention to provide a manner of mounting ceramic nozzle guide vanes on a metal engine casing so that they remain fixed relative to the engine casing despite temperature changes and do not turn about their axes when subjected to aerodynamic or other loading, otherwise the gas flow through the guide vanes onto the rotating vanes is likely to be disturbed and the efficiency of the engine adversely affected.

In this specification "radial" and "radially" will be understood to mean a direction at right angles to the longitudinal axis of the engine, and also refers to the long axis of a nozzle guide vane.

SUMMARY OF THE INVENTION

According to the present invention there is provided in a gas turbine engine having a ceramic nozzle guide vane and a metal engine casing, a nozzle guide vane mounting comprising on the radially outermost end of the vane a circumferential flange extending at right angles to the long axis of the vane, a first spacing means for applying a radially outwardly directed force to the radially inner surface of the flange, a second spacing means, being a spring means, for applying a radially inwardly directed force to the radially outer surface of the flange, and first and second structural members of the engine casing to nip the first and second spacing means against the flange.

Preferably, the first and second structural members of the engine casing are each provided by a respective annular flange defining an aperture through the engine casing, the axis of each annular flange being a radial axis of the engine.

Preferably, the first spacing means is a spring means.

In one embodiment the first spacing means may be a washer means.

Preferably, the washer means is provided with an upstanding annular ridge located to provide line contact only between the washer means and the radially inner surface of the flange.

Preferably, the or each spring means is provided by a respective hollow torus of resilient material having as its major axis the long axis of the nozzle guide vane.

Preferably, the or each hollow torus is split along a circumferential inner line facing said major axis to provide a C-ring seal.

Preferably, the or each torus is a helically coiled ring.

There may be provided loosely fitting within the or each hollow torus an annular insert.

The annular insert is preferably a braided wire.

Preferably, the nozzle guide vane is provided with an integral outer platform located radially inwardly of the circumferential flange and spaced from the engine casing.

BRIEF DESCRIPTION OF THE DRAWINGS

The invention will now be described by way of example only with reference to the accompanying diagrammatic non-scale drawings in which.

DESCRIPTION OF THE PREFERRED EMBODIMENT

Figure 1:
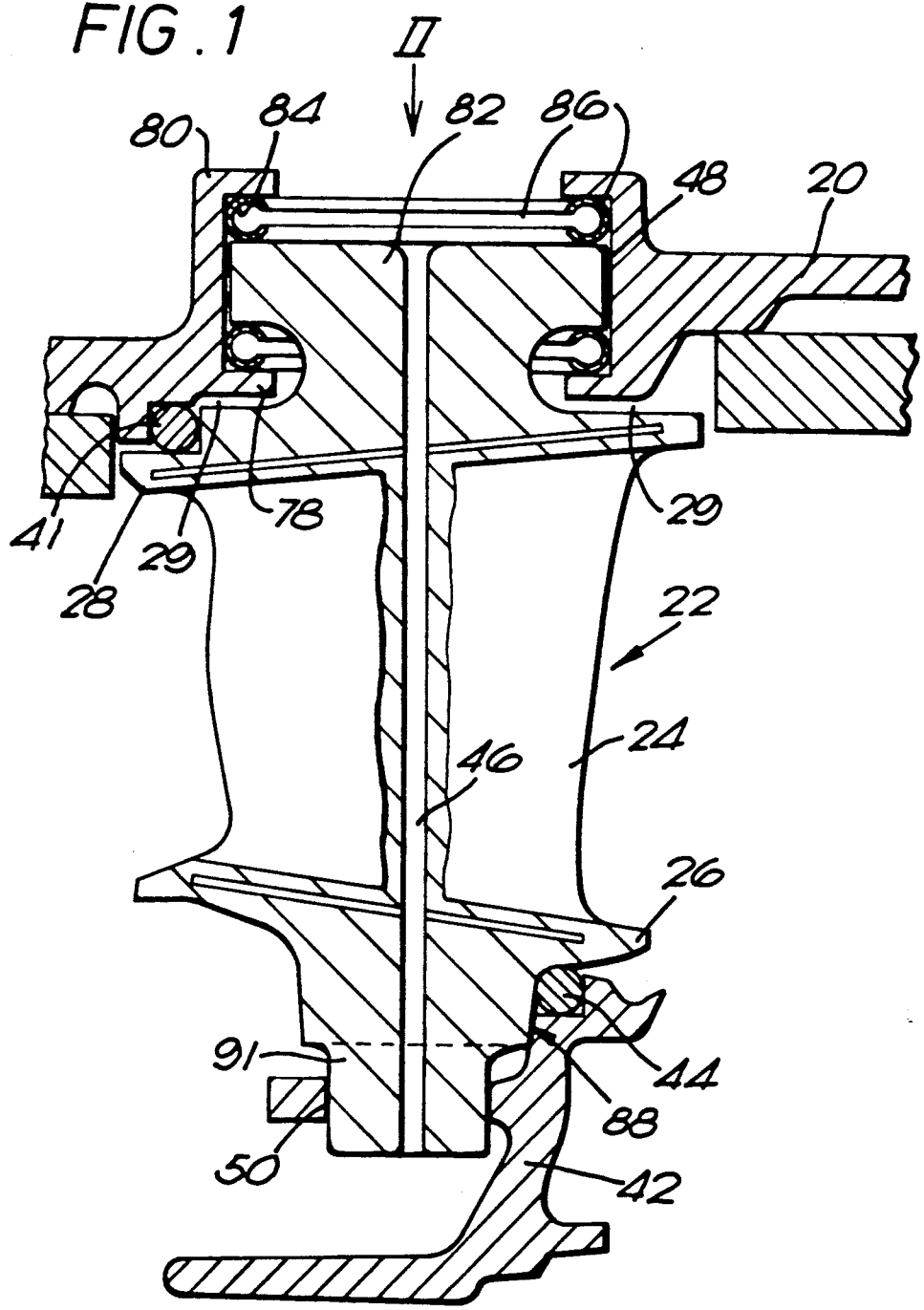
FIG. 1 shows a section through a nozzle guide vane of a gas turbine engine and through an associated part of the engine casing, showing C-ring seals as used in the invention.
Figure 2:
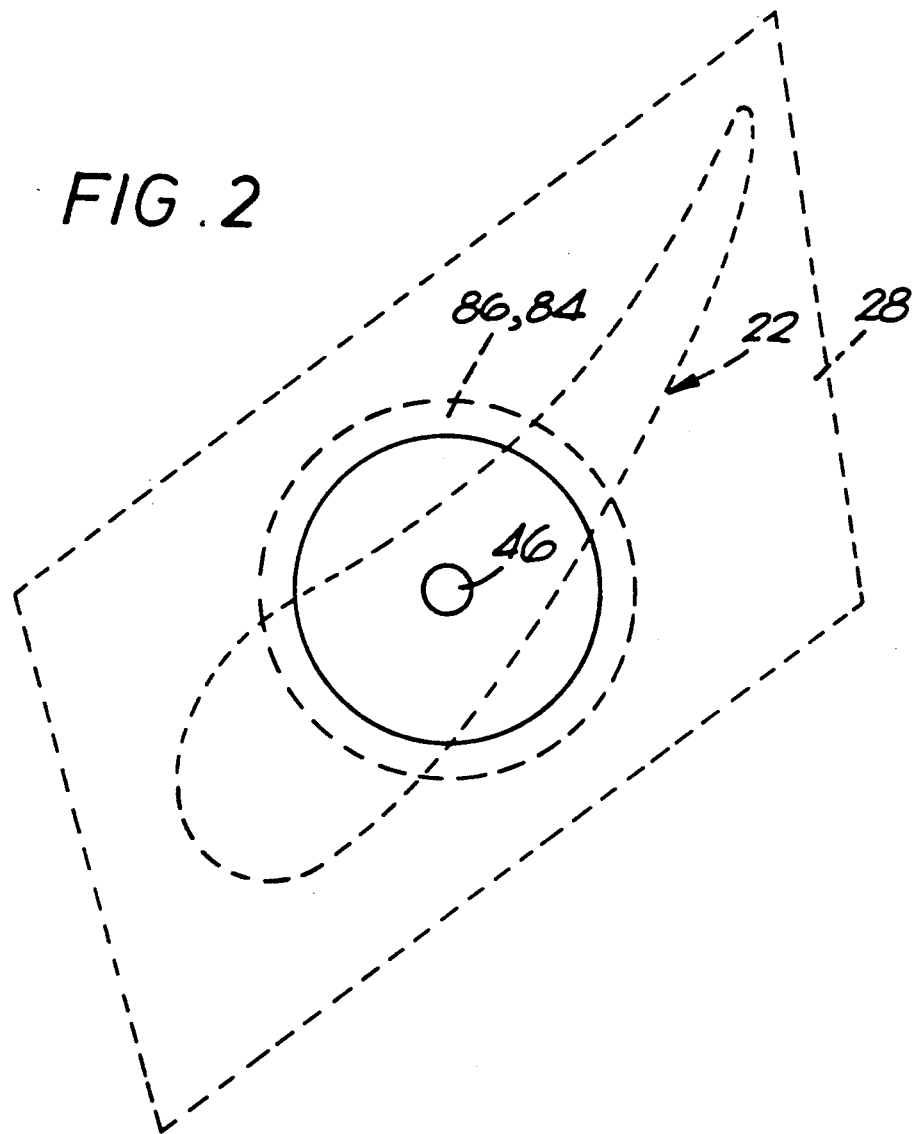
FIG. 2 is a plan view of the nozzle guide vane of FIG. 1 taken in the direction of arrow II.

Referring now to FIG. 1, and, where appropriate, FIG. 2, there is shown a portion of a cylindrical turbine engine casing 20 made of metal and, within the casing, a ceramic nozzle guide vane 22 which comprises an aerofoil section 24, a radially inner platform 26, and an outer platform 28 located radially outward of the aerofoil section and extending upstream and downstream therefrom. The shroud member 28 is separated from the engine casing 20 by an annular space 29. A sealing ring 41 is provided between the shroud member 28 and the engine casing 20 adjacent an upstream portion of the shroud member. The inner platform 26 of the nozzle guide vane 22 is supported against a seal ring interstage 42 by a ring seal 44. A channel 46 for supplying cooling and/or sealing air extends radially through the platform 26, aerofoil 24, and outer platform 28. A second channel 48, in alignment with channel 46, extends through the turbine casing 20. A third channel 50, also in alignment with channel 46, extends through the seal ring interstage 42 and guides the inner pillar 91 of the nozzle guide vane through the seal ring interstage 42.

The radially inner and outer ends of the channel 48 through the turbine casing 20 are defined by respective inner and outer circumferential flanges 78, 80 extending inwards towards the axis of the channel 48.

That part of the nozzle guide vane 22 radially outwards of the outer platform 28 is provided by a circumferential flange 82 at the end of the vane extending at right angles to the long axis of the vane and located between flanges 78 and 80, which overlap said flange 82. Radially spaced spacing means provided by inner and outer hollow toroidal C-ring seals 84, 86, parallel to the longitudinal axis of the engine, are nipped in compression between the respective flanges 78 and 80 and the circumferential flange 82 of the guide vane 22, there being one pair of C-ring seals 84, 86 for each nozzle guide vane. Each C-ring may be made of a heat-resistant nickel-based alloy and is provided with a split along the full length of a circumferential inner line facing the long axis of the vane. The C-ring seals 84, 86 therefore act as springs, the inner seal 84 providing a radially outwardly directed reaction to the radially inner surface of the flange 82, the outer seal 86 likewise providing a radially inwardly directed reaction to the radially outer surface of the vane flange 82, and both seals hence gripping firmly the guide vane flange.

The radial spacing of the C-ring seals 84, 86, in conjunction with the spacing 29 between the shroud member 28 and the inner part of the engine casing 20, permits the vane 22 to be movable in all directions relative to the engine casing, whilst being firmly retained in the casing, because the C-ring seals are able to act as springs independently of each other. In this connection, a surface 90 of the flange 82 facing the inner surface of the channel 48 is radiused so as to prevent the flange 82 from jamming in the channel should the nozzle pivot in the casing in reaction to the gas loads. Furthermore, dimensional changes of the metal engine casing 20 relative to the ceramic vane 22 are taken up by the resilience of the C-ring seals.

If the aerodynamic load on the vane varies in direction as the engine power varies, so that the load is no longer directed through the axis of the vane, then the vane will have a tendency to rotate about its axis. This is reacted by the nip of the C-ring seals 84, 86. If required, the tendency to rotate could also be reacted at point 88, i.e. between a region of the nozzle radially inward of the inner platform 26 and the seal ring interstage 42. Similarly, this could be done at any other abutting location.

Channel 50 is radiused to prevent pillar 91 from jamming in the channel as the nozzle pivots in reaction to gas loads.

The flexibility provided by the seals 84 and 86 ensures that any misalignment, whether during manufacture or from temperature distortion as the engine operates, between channel 48 and channel 50 does not exert unnecessarily high loads onto any part of the ceramic nozzle 22. Any misalignment will be absorbed by deflections in the seals 84, 86 and not in deflection of the vane itself.

One or both C-ring seals may need to be divided at least one location along its length so as to permit easy assembly within the engine casing flanges 78, 80.

Figure 3:
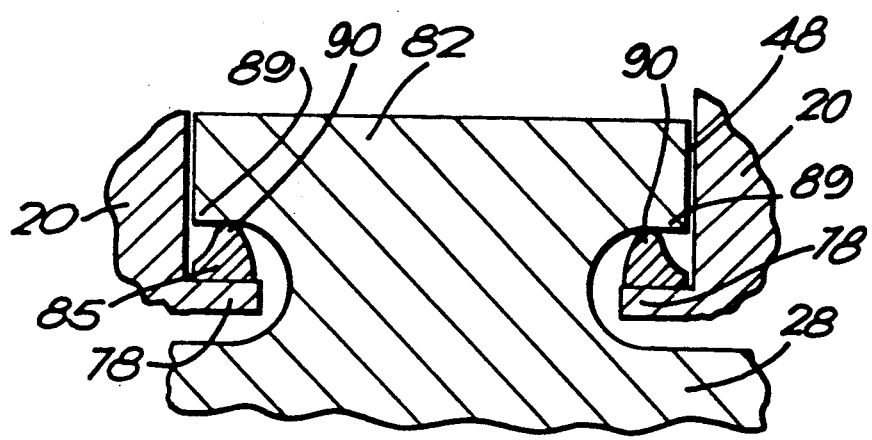
FIG. 3 is a detail view of FIG. 1 showing an alternative modification of the invention.

FIG. 3 shows an alternative embodiment of the invention in which the spacing provided by the inner C-ring seal 84 is provided instead by a washer 85. This may be required in circumstances wherein the temperature reached in the vicinity of the inner C-ring seal is too high for the ring to function effectively. In order to avoid the washer 85 applying a point loading at location 89 (an edge of the flange 82) then the washer may be provided with an annular upstanding ridge 90 to provide line contact only between the washer and the radially inner surface of the flange 82. One dimensional loading here is acceptable.

Figure 4:
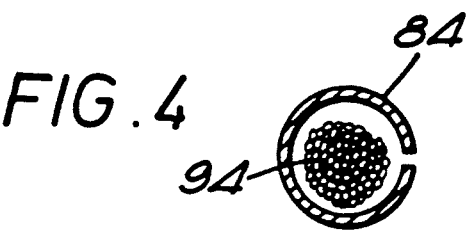
FIG. 4 is a cross-section through a modified C-ring seal for use in the embodiment of FIG. 1.

In the further embodiment illustrated in FIG. 4 the C-ring seal 84 is shown with a braided wire insert 94 loosely enclosed within the seal. The purpose of this is to prevent the seal 84 from collapsing completely under unscheduled conditions of extreme heat, which complete collapse may cause the vane to twist and bring it into contact with a rotating turbine blade. An annular insert other than braided wire may be used to prevent collapse, and insert 94 may be inserted into C-ring seal 86 if required.

Other alternative forms of spacing between the engine casing flanges 78, 80 and the vane flange 82 may be provided, such as helically coiled rings or leaf springs. Helically coiled rings may also be provided with inserts 94, as described above.

What I claim is:

1. In a gas turbine engine having a ceramic nozzle guide vane and a metal engine casing, a nozzle guide vane mounting comprising on a radially outermost end of the vane a circumferential flange extending at right angles to a long axis of the vane, a first spacing means, being a washer means, for applying a radially outwardly directed force to a radially inner surface of the flange, a second spacing means, being at least one spring means, for applying a radially inwardly directed force to a radially outer surface of the flange, and first and second structural members of the engine casing to nip the first and second spacing means against the flange, the first and second structural members of the engine casing being each provided by a respective annular flange defining an aperture through the engine casing, the axis of each annular flange being a radial axis of the engine, wherein the washer means is provided with an upstanding annular ridge located to provide line contact only between the washer means and the radially inner surface of the flange.

2. The nozzle guide vane mounting as claimed in claim 1 wherein the nozzle guide vane is provided with an integral outer platform located radially inwardly of the circumferential flange and spaced from the engine casing.

3. In a gas turbine engine having a ceramic nozzle guide vane and a metal engine casing, a nozzle guide vane mounting comprising on a radially outermost end of the vane a circumferential flange extending at right angles to a long axis of the vane, a first spacing means for applying a radially outwardly directed force to a radially inner surface of the flange, a second spacing means, being at least one spring means, for applying a radially inwardly directed force to a radially outer surface of the flange, and first and second structural members of the engine casing to nip the first and second spacing means against the flange, the first and second structural members of the engine casing being each provided by a respective annular flange defining an aperture through the engine casing, the axis of each annular flange being a radial axis of the engine, wherein the at least one spring means is provided by at least one helically coiled ring of resilient material having as its major axis and the long axis of the nozzle guide vane.

4. The nozzle guide vane mounting as claimed in claim 3 wherein said at least one helically coiled ring is split along a circumferential inner line facing said major axis to provide a C-ring seal.

5. The nozzle guide vane mounting as claimed in claim 3 wherein there is provided loosely fitting within said at least one helically coiled ring an annular insert.

6. The nozzle guide vane mounting as claimed in claim 5 wherein the annular insert is a braided wire.

7. The nozzle guide vane mounting as claimed in claim 3 wherein the nozzle guide vane is provided with an integral outer platform located radially inwardly of the circumferential flange and spaced from the engine casing.

8. The nozzle guide vane mounting as claimed in claim 3, wherein the first spacing means is a spring means.

* * * * *